US009671911B2

(12) United States Patent
Yang et al.

(10) Patent No.: US 9,671,911 B2
(45) Date of Patent: Jun. 6, 2017

(54) TOUCH INPUT CONTROL METHOD AND DEVICE

(71) Applicant: Xiaomi Inc., Beijing (CN)

(72) Inventors: Kun Yang, Beijing (CN); Bo Zhang, Beijing (CN); Ling Zhu, Beijing (CN)

(73) Assignee: Xiaomi Inc., Beijing (CN)

( * ) Notice: Subject to any disclaimer, the term of this patent is extended or adjusted under 35 U.S.C. 154(b) by 121 days.

(21) Appl. No.: 14/578,715

(22) Filed: Dec. 22, 2014

(65) Prior Publication Data

US 2015/0338954 A1 Nov. 26, 2015

Related U.S. Application Data

(63) Continuation of application No. PCT/CN2014/089246, filed on Oct. 23, 2014.

(30) Foreign Application Priority Data

May 22, 2014 (CN) .......................... 2014 1 0219188

(51) Int. Cl.
*G06F 3/044* (2006.01)
*G06F 3/041* (2006.01)
*G06F 3/0488* (2013.01)

(52) U.S. Cl.
CPC ............ *G06F 3/044* (2013.01); *G06F 3/0418* (2013.01); *G06F 3/04886* (2013.01)

(58) Field of Classification Search
CPC .......................... G06F 3/044; G09G 2330/021
See application file for complete search history.

(56) References Cited

U.S. PATENT DOCUMENTS

| 6,459,424 B1 | 10/2002 | Resman |
| 2012/0262407 A1 | 10/2012 | Hinckley et al. |
| 2013/0207913 A1 | 8/2013 | Takashima et al. |
| 2015/0346903 A1* | 12/2015 | O'Connor .............. G09G 5/003 345/173 |
| 2016/0154526 A1* | 6/2016 | Hao ........................ G06F 3/044 345/174 |

FOREIGN PATENT DOCUMENTS

| CN | 101620455 A | 1/2010 |
| CN | 102768595 A | 11/2012 |
| CN | 103064548 A | 4/2013 |

(Continued)

OTHER PUBLICATIONS

International Search Report of PCT/CN2014/089246, from the State Intellectual Property Office of China, mailed Feb. 11, 2015.

(Continued)

*Primary Examiner* — Gerald Johnson
(74) *Attorney, Agent, or Firm* — Finnegan, Henderson, Farabow, Garrett & Dunner LLP

(57) ABSTRACT

A method for use in a device having a touch screen, includes: identifying touch information at a fringe area of the touch screen as fringe touch information; determining, according to a touch shape corresponding to the fringe touch information, whether the fringe touch information includes palm touch information generated from a palm touch by any part of a user's palm; and blocking the palm touch information if it is determined that the fringe touch information includes the palm touch information.

17 Claims, 17 Drawing Sheets

(56) References Cited

FOREIGN PATENT DOCUMENTS

| | | |
|---|---|---|
| CN | 103176653 A | 6/2013 |
| CN | 103235695 A | 8/2013 |
| CN | 103246415 A | 8/2013 |
| CN | 103513865 A | 1/2014 |
| CN | 104020878 A | 9/2014 |
| EP | 2626778 A2 | 8/2013 |
| JP | 2010009514 A | 1/2010 |
| JP | 2012093932 A | 5/2012 |
| JP | 2013025357 A | 2/2013 |
| JP | 2013041629 A | 2/2013 |
| JP | 2013097400 A | 5/2013 |
| JP | 2013228831 A | 11/2013 |
| JP | 2014006654 A | 1/2014 |
| JP | 2014052950 A | 3/2014 |
| RU | 2420784 C2 | 6/2011 |
| RU | 2455676 C2 | 7/2012 |
| WO | WO 2013/128911 A1 | 9/2013 |
| WO | WO 2013/172768 A2 | 11/2013 |

OTHER PUBLICATIONS

Partial European Search Report for EP 15161021.9 from the European Patent Office, mailed Jun. 8, 2015.

English version of International Search Report of PCT/CN2014/089246, from the State Intellectual Property Office of China, mailed Feb. 11, 2015.

Notification on Results of Examining Patentability of Invention Office Action mailed on Jul. 12, 2016 in counterpart Russian Application No. 2014153895/08(086242) and English translation thereof.

Notice of Allowance for Korean Application No. 10-2014-7035869, from the Korean Intellectual Property Office, dated Jan. 6, 2017.

* cited by examiner

TOUCH INPUT CONTROL METHOD AND DEVICE

CROSS-REFERENCE TO RELATED APPLICATIONS

This application is a Continuation of International Application No. PCT/CN2014/089246, filed Oct. 23, 2014, which is based upon and claims priority to Chinese Patent Application No. 201410219188.9, filed May 22, 2014, the entire contents of all of which are incorporated herein by reference.

TECHNICAL FIELD

The present disclosure generally relates to the field of intelligent terminals, and, more particularly, to a touch input control method and device.

BACKGROUND

With the development of intelligent terminals, a terminal can use a touch panel (TP), also known as a touch screen, to provide a user with a touch input function. The TP generally includes a capacitive touch sensor for the terminal to realize multi-point touch human-computer interaction. In order to enhance user touch experience, a frame of the touch screen is made narrower so as to provide users with a wider touch area. However, as the touch screen frame becomes narrower, the user's non-finger parts (for example, a part of the user's palm connected to the user's thumb) may likely touch the touch screen when the user holds the terminal. As a result, touch information generated by an unintended touch may be obtained and reported by a touch integrated-circuit (IC) chip to the terminal.

SUMMARY

According to a first aspect of the present disclosure, there is provided a method for use in a device having a touch screen, comprising: identifying touch information at a fringe area of the touch screen as fringe touch information; determining, according to a touch shape corresponding to the fringe touch information, whether the fringe touch information includes palm touch information generated from a palm touch by any part of a user's palm; and blocking the palm touch information if it is determined that the fringe touch information includes the palm touch information.

According to a second aspect of the present disclosure, there is provided a device, comprising: a processor; a touch screen; and a memory configured to store instructions executable by the processor; wherein the processor is configured to: identify touch information at a fringe area of the touch screen as fringe touch information; determine, according to a touch shape corresponding to the fringe touch information, whether the fringe touch information includes palm touch information generated from a palm touch by any part of a user's palm; and block the palm touch information if it is determined that the fringe touch information includes the palm touch information.

According to a third aspect of the present disclosure, there is provided a non-transitory computer-readable storage medium having stored therein instructions that, when executed by a processor of a device having a touch screen, cause the device to perform a touch input control method, the method comprising: identifying touch information at a fringe area of the touch screen as fringe touch information; determining, according to a touch shape corresponding to the fringe touch information, whether the fringe touch information includes palm touch information generated from a palm touch by any part of a user's palm; and blocking the palm touch information if it is determined that the fringe touch information includes the palm touch information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
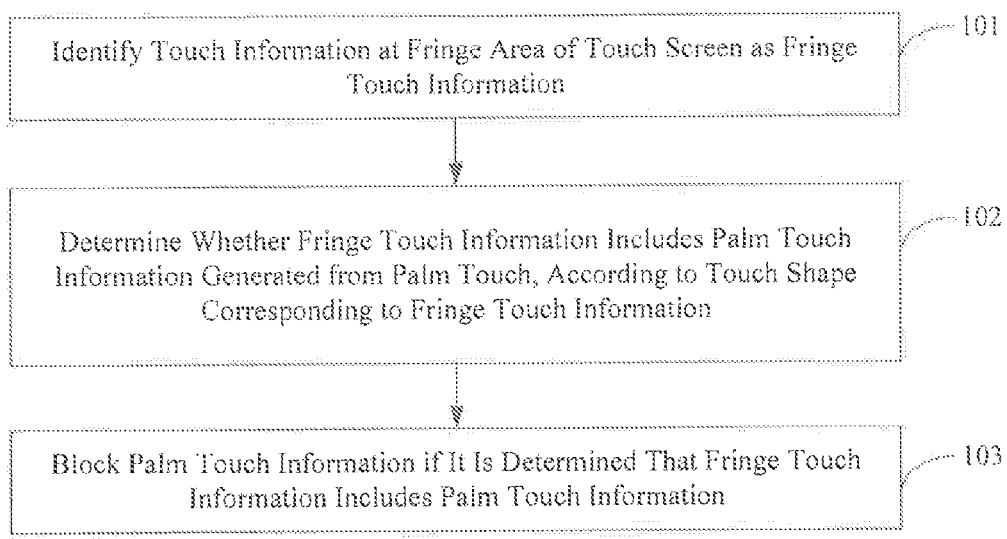
FIG. 1 is a flow chart of a touch input control method, according to an exemplary embodiment.

FIG. 1 is a flow chart of a touch screen control method 100, according to an exemplary embodiment. For example, the method 100 is used in a terminal having a touch screen. Referring to FIG. 1, the method 100 includes following steps.

In step 101, the terminal identifies touch information at a fringe area of the touch screen as fringe touch information.

In exemplary embodiments, the terminal may be any device that supports touch input. The terminal may be provided with a capacitive touch screen (TP) for supporting multi-point touch input. For example, the capacitive touch screen includes a metal layer, such as a layer of special transparent metal conductive material, pasted on the surface of a glass panel. When a user conducts a touch operation on the metal layer, a capacitance of a capacitor corresponding to a touch position on the touch screen changes, so that a frequency of an oscillator connected with the capacitor also changes. A touch integrated circuit (IC) chip in the terminal identifies the touch position by measuring a variation of the frequency, thus obtaining touch information.

In exemplary embodiments, the user may hold the terminal with one hand and make touch input with the other hand when using the terminal. If a frame of the touch screen is narrow, the user's palm part, for example, any part of the user's palm connected to the user's thumb, may touch the fringe area of the touch screen when the user holds the terminal. In the illustrated embodiment, the fringe area is determined on the touch screen in advance, and is a relatively narrow area on the periphery of the touch screen. Any area on the touch screen not in the fringe area may be considered a central area.

In exemplary embodiments, when the user performs a touch operation on the touch screen, the touch information generated by the touch operation is obtained. The touch information may include position coordinates of the touch input including, e.g., an x-coordinate and a y-coordinate, a size of the touch area, a touch status (e.g., touching, lifting, sliding, etc.) and the like. The terminal judges whether the touch operation is performed in the fringe area of the touch screen according to the position coordinates in the touch information, and identifies the touch information as fringe touch information if the touch operation is performed in the fringe area of the touch screen.

In step 102, the terminal determines whether the fringe touch information includes palm touch information generated from a palm touch by any part of the user's palm, according to a touch shape corresponding to the fringe touch information.

In exemplary embodiments, the touch operation in the fringe area of the touch screen may form corresponding touch spots on the touch screen, and the touch shape corresponding to the fringe touch information may be obtained from a distribution of these touch spots. Then it is judged whether the touch shape corresponding to the fringe touch information matches a preset palm touch shape. The terminal determines that the fringe touch information includes the palm touch information if the touch shape corresponding to the fringe touch information matches the preset palm touch shape.

In step 103, the terminal blocks the palm touch information if it is determined that the fringe touch information includes the palm touch information.

In exemplary embodiments, to block the palm touch information, a subarea in the fringe area corresponding to the palm touch information is identified. The touch input function of the subarea is then disabled.

Figure 2A:
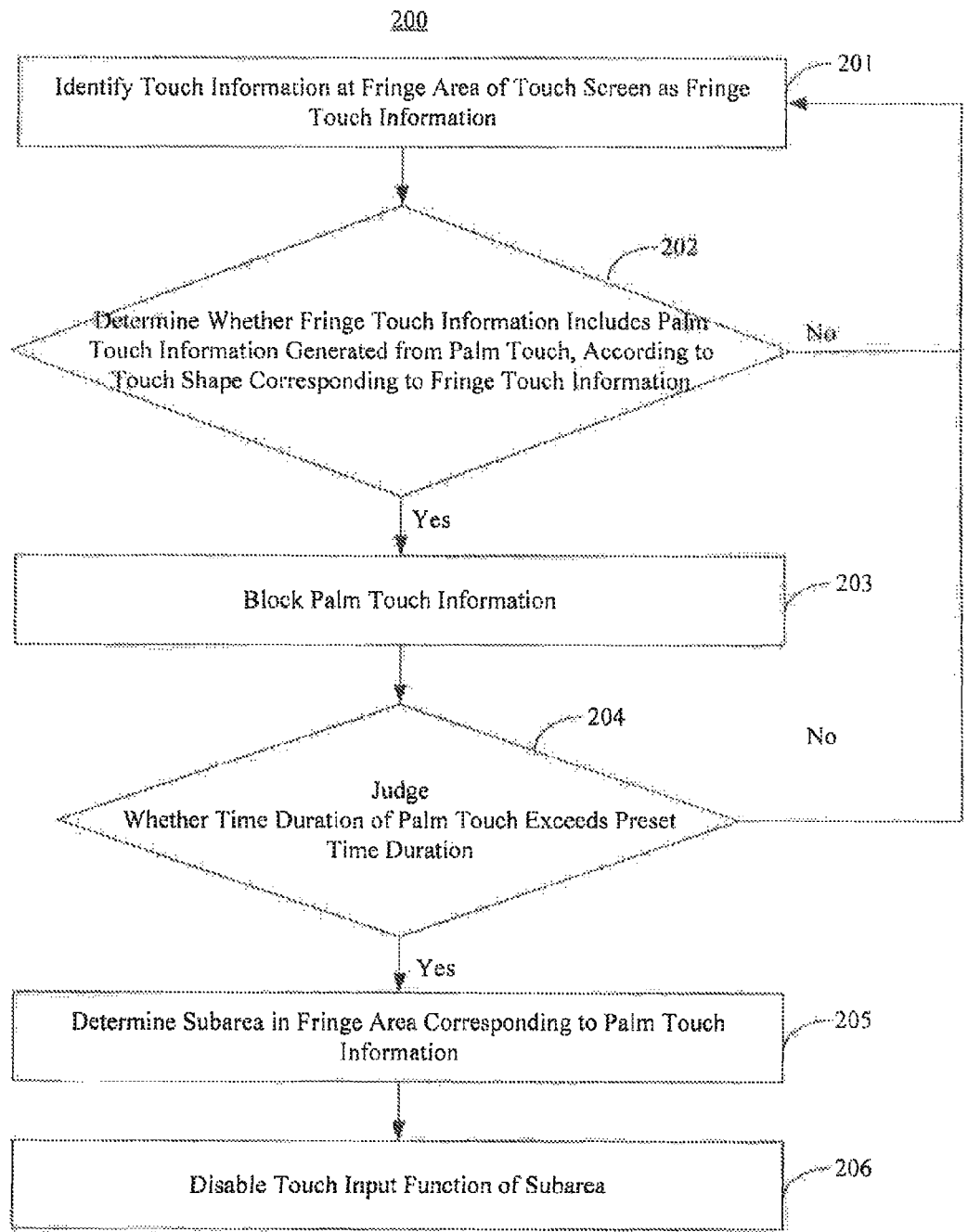
FIG. 2A is a flow chart of a touch input control method, according to an exemplary embodiment.

FIG. 2A is a flow chart of a touch screen control method 200, according to an exemplary embodiment. For example, the method 200 may be used in a terminal having a touch screen. Referring to FIG. 2A, the method 200 includes following steps.

In step 201, the terminal identifies touch information at a fringe area of the touch screen as fringe touch information.

In exemplary embodiments, a user may hold the terminal with one hand and make touch input with the other hand when using the terminal. Because a frame of the touch screen is relatively narrow, the user's palm part, for example, a part of the user's palm connected to the user's thumb, may touch the fringe area of the touch screen when the user holds the terminal. In the illustrated embodiment, the fringe area is determined on the touch screen in advance, and is a relatively narrow area on the periphery of the touch screen. Any area on the touch screen not in the fringe area may be considered a central area.

Figure 2B:
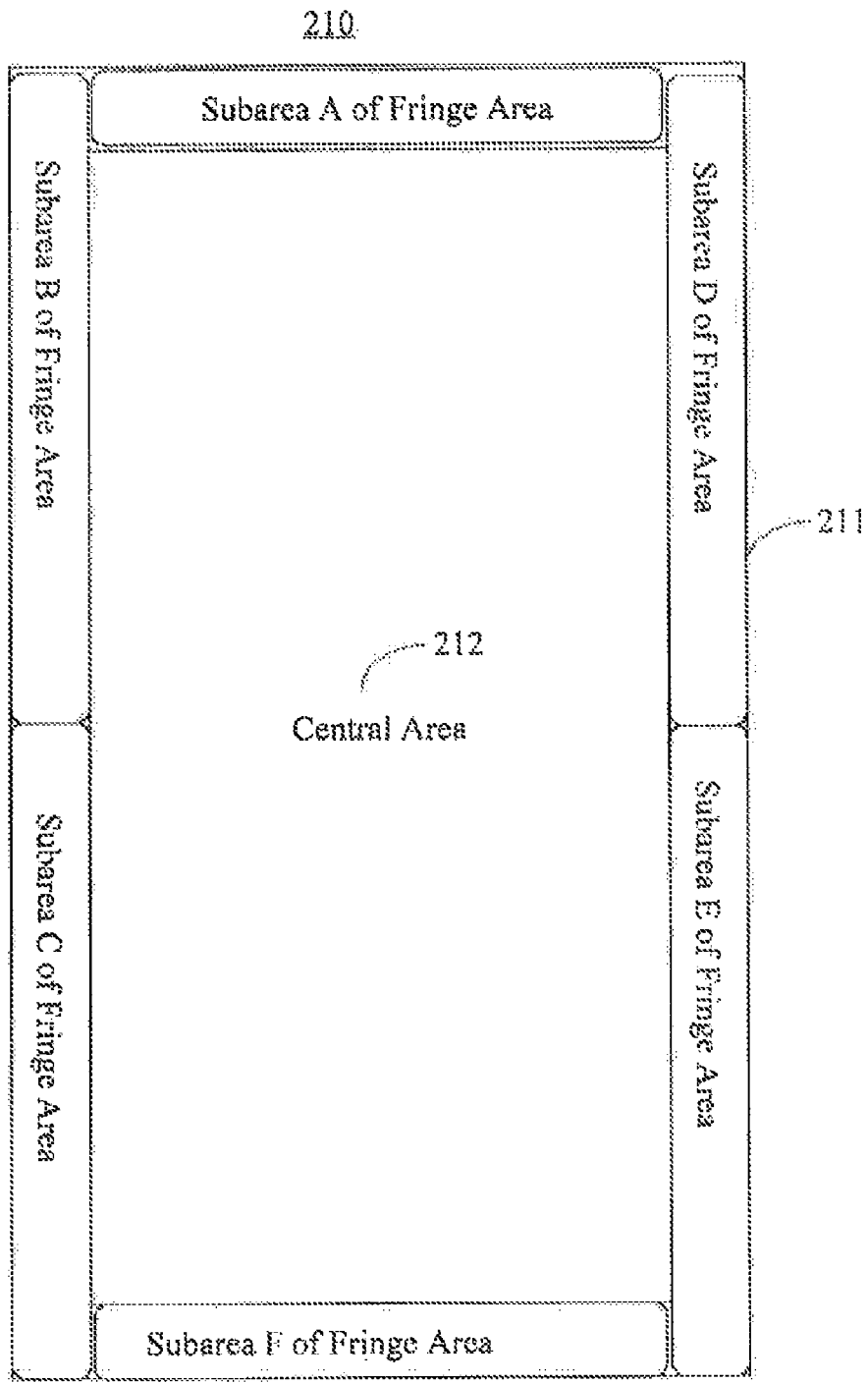
FIG. 2B is a schematic diagram showing a division of a touch screen, according to an exemplary embodiment.

For example, FIG. 2B is a schematic diagram showing an area division 210 of the touch screen of the terminal, according to an exemplary embodiment. Referring to FIG. 2B, the touch screen is divided into a fringe area 211 and a central area 212, Based on possible touch positions by the user's palm on the fringe area 211, the fringe area 211 is further divided into a plurality of subareas, e.g., subarea A, subarea B, subarea C, subarea D, subarea E, and subarea F.

In exemplary embodiments, when the user performs a touch operation on the touch screen, the touch information generated by the touch operation is obtained. The touch information may include position coordinates of the corresponding touch input including, e.g., an x-coordinate and a y-coordinate, a size of the touch area, a touch status (touching, lifting, sliding, etc.) and the like. The terminal determines whether the touch operation is performed in the fringe area of the touch screen according to the position coordinates in the touch information, and identifies the touch information as the fringe touch information if it is determined that the touch operation is performed in the fringe area of the touch screen. In the embodiment in FIG. 2I, the touch information may be identified as the fringe touch information if the terminal determines that the touch operation is performed in any one of the subareas A-F according to the position coordinates in the touch information.

Referring back to FIG. 2, in step 202, the terminal determines, according to a touch shape corresponding to the fringe touch information, whether the fringe touch information includes palm touch information generated from a palm touch by any part of the user's palm. The terminal performs step 203 if it is determined that the fringe touch information includes the palm touch information (202—Yes). Otherwise (202—No), the terminal repeats step 201.

In exemplary embodiments, the touch operation performed in the fringe area of the touch screen may form corresponding touch spots on the touch screen, and the touch shape corresponding to the fringe touch information may be obtained from a distribution of these touch spots. The terminal further determines whether the touch shape corresponding to the fringe touch information matches a preset palm touch shape. The terminal determines that the fringe touch information includes the palm touch information if the obtained touch shape corresponding to the fringe touch information matches the preset palm touch shape.

Figure 2C:
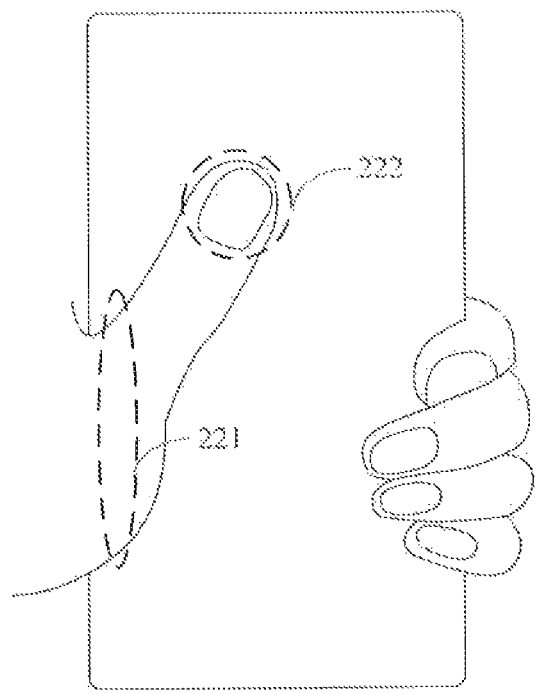
FIG. 2C is a schematic diagram showing a user's holding of a device, according to an exemplary embodiment.

FIG. 2C is a schematic diagram showing a user's holding of the terminal, according to an exemplary embodiment. Referring to FIG. 2C, the user holds the terminal with the left hand, with the palm part touching the fringe area of the touch screen and forming a first plurality of touch spots on the fringe area. The shape of a distribution of the first plurality of touch spots is a dashed oval 221, corresponding to the palm part. A second plurality of touch spots are formed in the central area by the user's thumb tip. The shape of a distribution of the second plurality of touch spots is a dashed circle 222, corresponding to the thumb tip. Accordingly, the first plurality of touch spots by the palm touch and the second plurality of touch spots by the finger touch can be distinguished according to the different shapes corresponding to the touch information.

Figure 2D:
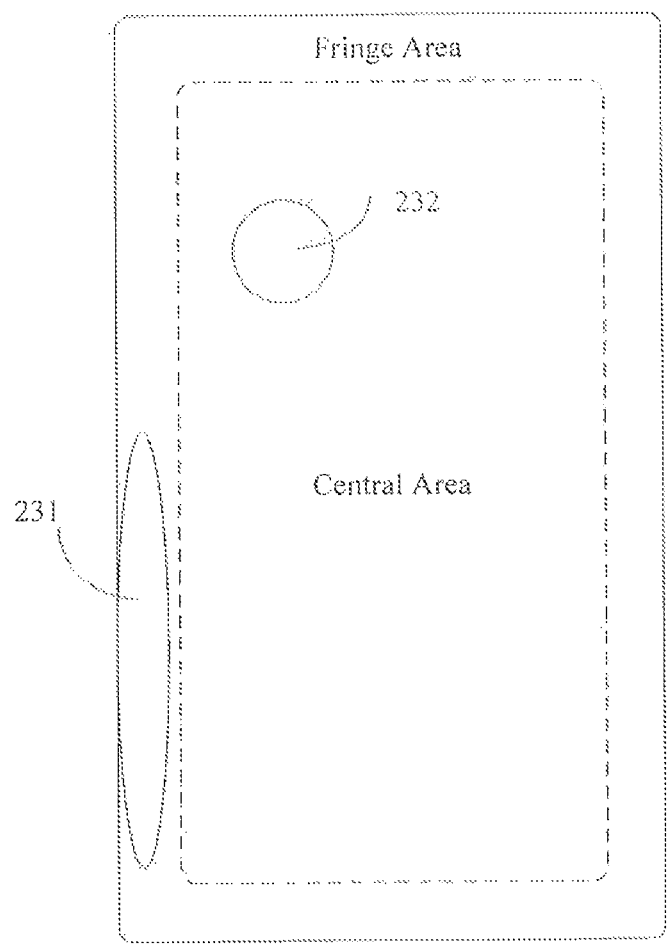
FIG. 2D is a schematic diagram showing areas on a touch screen from which touch information is generated, according to an exemplary embodiment.

FIG. 2D is a schematic diagram showing the areas on the touch screen from which touch information is generated, according to an exemplary embodiment. In the illustrated embodiment, it is assumed that the user holds the terminal in the manner shown in FIG. 2C. The terminal obtains from the fringe area of the touch screen an oval shape 231 corresponding to the palm touch when the touch screen is touched by the user's palm part, and obtains from the central area of the touch screen a circular shape 232 corresponding to the finger touch when the touch screen is touched by the user's thumb tip. Because the palm touch and the finger touch correspond to different shapes on the touch screen, these shapes can be preset for the terminal to differentiate the palm touch from the finger touch.

Accordingly, after obtaining the touch shape corresponding to the fringe touch information, the terminal compares the obtained touch shape with the preset palm touch shape. The terminal determines that the fringe touch information includes the palm touch information if the obtained touch shape corresponding to the fringe touch information matches the preset palm touch shape, e.g., the oval shape in FIG. 2D.

Figure 2E:
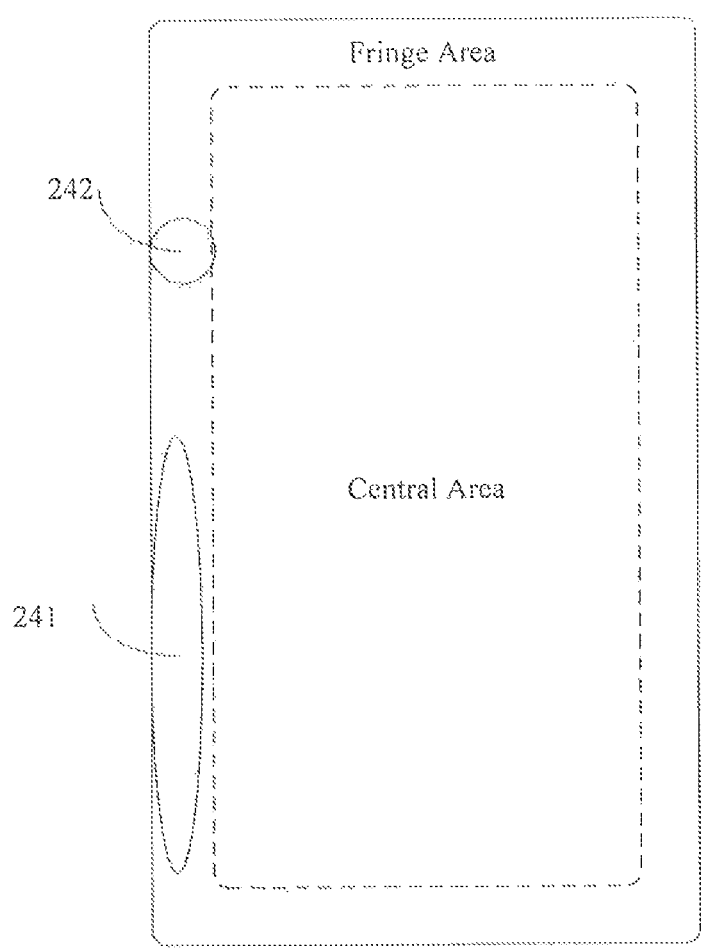
FIG. 2E is a schematic diagram showing areas on a touch screen from which touch information is generated, according to an exemplary embodiment.

In another exemplary embodiment, the user's thumb tip may also touch the fringe area. FIG. 2E is a schematic diagram showing areas on the touch screen from which fringe touch information is generated, according to an exemplary embodiment. In FIG. 2E, the terminal obtains from the fringe area of the touch screen an oval shape 241 corresponding to the palm touch and a circular shape 242 corresponding to the finger touch.

Referring back to FIG. 2A, in step 203, the terminal blocks the palm touch information.

In exemplary embodiments, when it is determined at step 203 that the fringe touch information includes the palm touch information, the terminal directly blocks the palm touch information, e.g., not having the palm touch information reported to its processor. In the embodiment in FIG. 2D, the terminal blocks the palm touch information corresponding to the oval 231 in the fringe area of the touch screen. In the embodiment in FIG. 2E, the terminal blocks the palm touch information corresponding to the oval 241 in the fringe area of the touch screen. In either case, the terminal may block only the palm touch information instead of normal touch input information within any area on the touch screen.

In exemplary embodiments, if the user's palm part slides a distance on the touch screen when holding the terminal, the user's palm part may generate palm touch information in the central area of the touch screen during the sliding. This palm touch information is not the user's intended touch input. Therefore, the palm touch information may be removed based on reported status information with regard to the palm touch. The status information may include information regarding a position coordinate on the touch screen where the palm touch is lifted, or information regarding a position coordinate indicating that the user's palm part slides out of the touch screen.

In step 204, the terminal judges whether a time duration of the palm touch on the touch screen exceeds a preset time duration. The terminal performs step 205 if the time duration of the palm touch exceeds the preset time duration (204—Yes). Otherwise (204—No), the terminal repeats step 201.

In the illustrated embodiment, the user's palm part may touch the fringe area of the touch screen for a long time when the user is holding the terminal, or may occasionally touch the fringe area when the user is conducting a touch input operation on the terminal. Therefore, it is further judged at step 204 whether the time duration of the palm touch on the touch screen exceeds the preset time duration, which defines a minimum time duration for determining the user holding the terminal. If it is determined that the palm touch information is generated by the user's holding the terminal, the terminal can further determine to disable a touch input function of a corresponding subarea in the fringe area.

In step 205, the terminal determines the subarea in the fringe area corresponds to the palm touch information.

In exemplary embodiments, the terminal compares the position coordinates in the palm touch information with a coordinate range of each subarea of the fringe area, and determines that a first subarea corresponding to the range including the position coordinates as the corresponding subarea. The terminal may also determine a second subarea associated with the first subarea as the corresponding subarea. For example, the second subarea may be a subarea receiving the user's finger touch corresponding to the palm touch for the user to hold the terminal, and the present disclosure is not limited thereto.

In the illustrated embodiments in FIGS. 2B-2E, if the time duration of the palm touch on the fringe area exceeds the preset time duration, the terminals determines that the subarea corresponding to the palm touch is subarea C by comparing the position coordinates in the touch information with the coordinate range of each subarea in the fringe area.

Figure 2F:
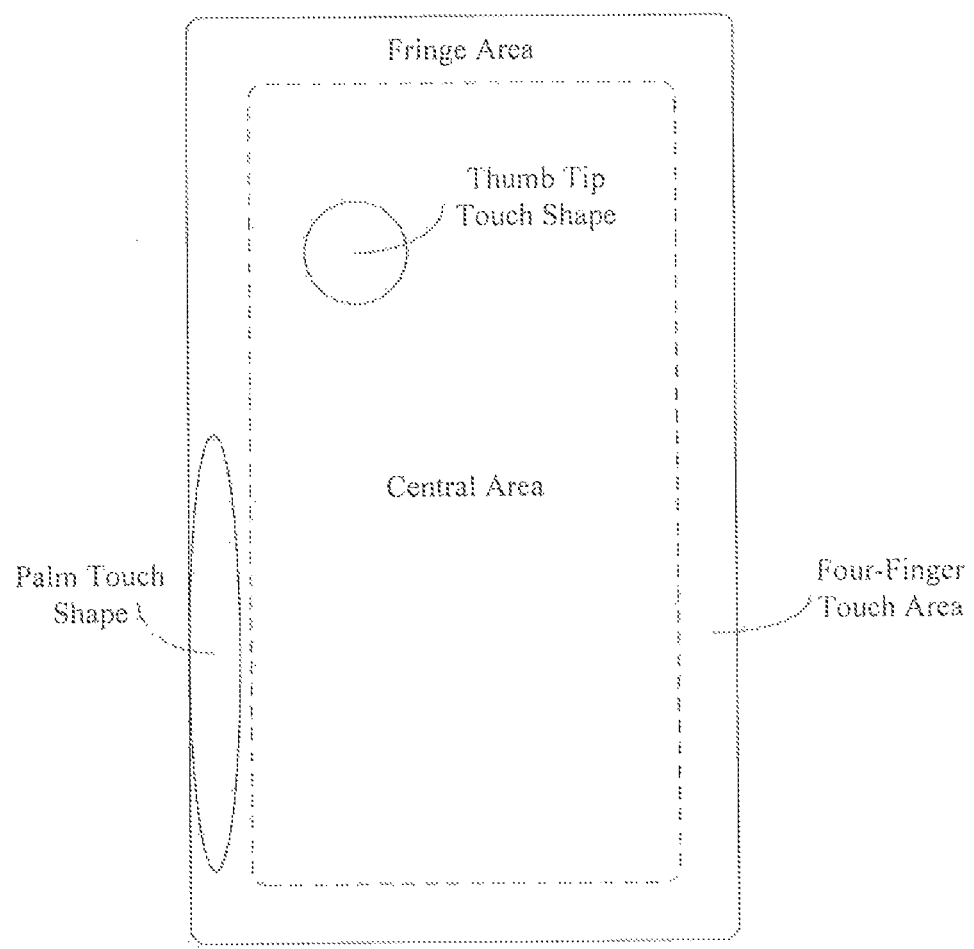
FIG. 2F is a schematic diagram showing areas on a touch screen from which touch information is generated, according to an exemplary embodiment.

FIG. 2F is a schematic diagram showing areas from which touch information is generated, according to an exemplary embodiment. In the illustrated embodiment, when the user's left hand is holding the terminal, the user's palm part holds the fringe area on the left of the touch screen, and the other four fingers of the left hand may hold the fringe area on the right of the touch screen, as shown in FIG. 2C. Thus, referring to FIGS. 2C and 2F, after identifying subarea C corresponding to the palm touch information, the terminal can also directly identify subarea E, opposite to subarea C, as an associated subarea, which is a subarea in which the finger touch operation corresponding to the palm touch operation is present.

In step 206, the terminal disables the touch input function of the corresponding subarea.

In the illustrated embodiment, although unintended touch input information is blocked, correct touch input information generated by a finger touch operation in the fringe area can still be received, which improves the accuracy of touch input. Besides, a corresponding subarea in the fringe area may be determined after blocking the palm touch information, and the touch input function of the corresponding subarea is disabled, which further improves the accuracy of touch input and also enhances user touch experience.

Figure 2G:
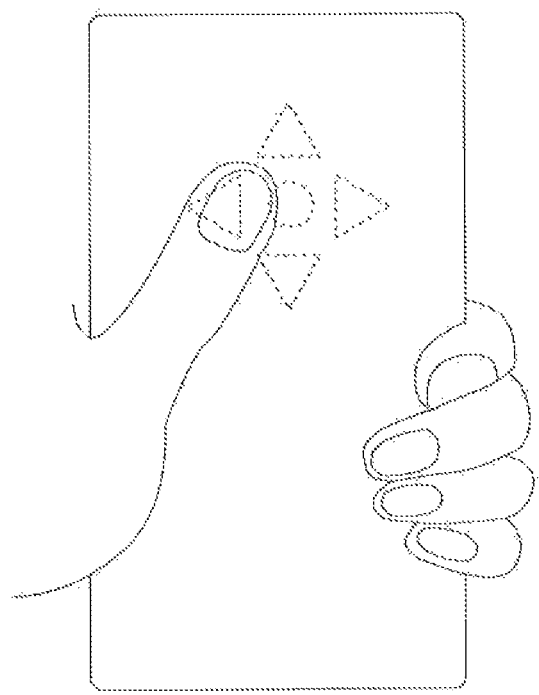
FIG. 2G is a schematic diagram of a virtual touch control interface displayed on a touch screen, according to an exemplary embodiment.

In exemplary embodiments, after detecting a touch operation area, e.g., the circular area 232 shown in FIG. 2D, on the touch screen by a touch operation, a virtual touch control interface may be displayed nearby the touch operation area so that the user can conduct input operations with the thumb. FIG. 2G is a schematic diagram of a virtual touch control interface 260 displayed on the touch screen of the terminal, according to an exemplary embodiment. In FIG. 2G a virtual touch control icon is displayed in the touch operation area nearby the thumb tip. It should be noted that, FIG. 2G only shows an example of the virtual touch control interface outputted in the thumb touch operation area. In actual applications, any finger touch operation area on the touch screen can be detected according to touch information, for example, an area of touch, a touch shape and the like, when the user is holding the terminal, and the touch control interface is outputted in the detected area.

Figure 3:
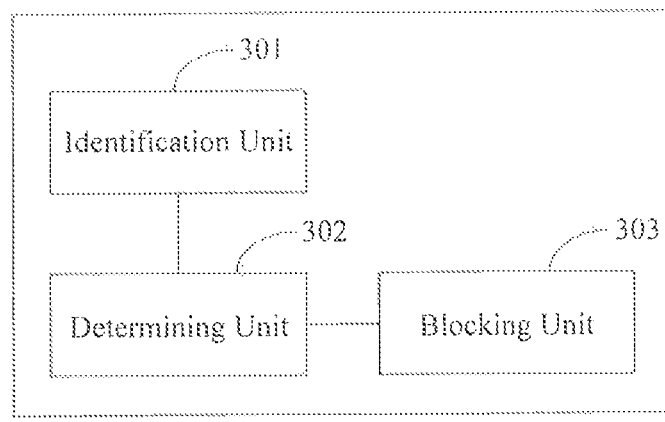
FIGS. 3-10 are block diagrams of touch input control apparatus, according to exemplary embodiments.

FIG. 3 is a block diagram of a touch input control apparatus 300, according to an exemplary embodiment.

Referring to FIG. 3, the apparatus 300 includes an identification unit 301, a determining unit 302, and a blocking unit 303.

In exemplary embodiments, the identification unit 301 is configured to identify touch information at a fringe area of a touch screen as fringe touch information. The determining unit 302 is configured to determine whether the fringe touch information includes palm touch information generated by a palm touch, according to a touch shape corresponding to the fringe touch information. The blocking unit 303 is configured to block the palm touch information if it is determined that the fringe touch information includes the palm touch information.

Figure 4:
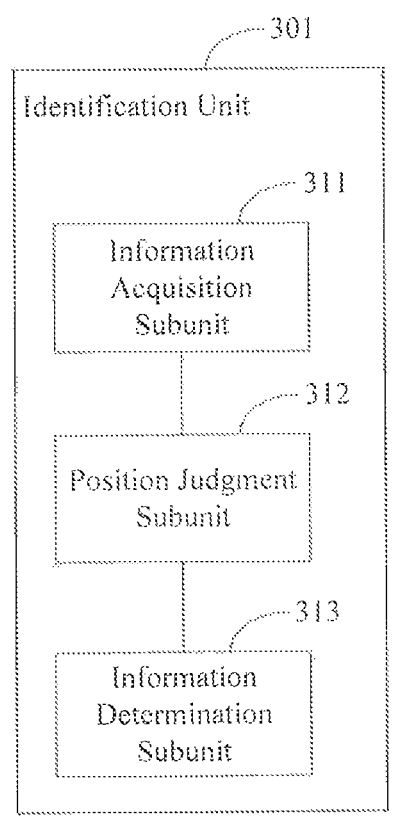

FIG. 4 is a block diagram of the identification unit 301 (FIG. 3), according to an exemplary embodiment. Referring to FIG. 4, the identification unit 301 includes an information acquisition subunit 311, a position judgment subunit 312, and an information determination subunit 313.

In exemplary embodiments, the information acquisition subunit 313 is configured to acquire touch information generated by a touch operation when the user conducts the touch operation on the touch screen. The position judgment subunit 312 is configured to judge whether the touch operation is performed in the fringe area of the touch screen according to a position coordinate in the touch information. The information determination subunit 313 is configured to determine the touch information as the fringe touch information if the touch operation is performed in the fringe area of the touch screen.

Figure 5:
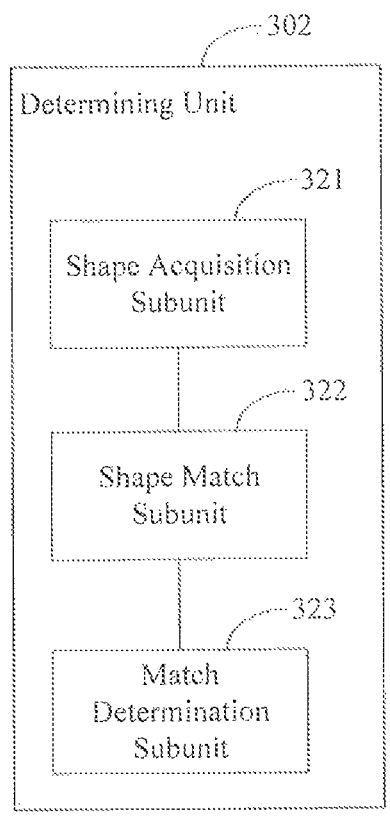

FIG. 5 is a block diagram of the determining unit 302 (FIG. 3), according to an exemplary embodiment. Referring to FIG. 5, the determining unit 302 includes a shape acquisition subunit 321, a shape match subunit 322, and a match determination subunit 323.

In exemplary embodiments, the shape acquisition subunit 321 is configured to obtain a touch shape corresponding to the fringe touch information based on a distribution of touch spots of the touch operation in the fringe area. The shape match subunit 322 is configured to judge whether the obtained touch shape corresponding to the fringe touch information matches a preset palm touch shape. The match determination subunit 323 is configured to determine the fringe touch information includes the palm touch information if the obtained touch shape corresponding to the fringe touch information matches the palm touch shape.

Figure 6:
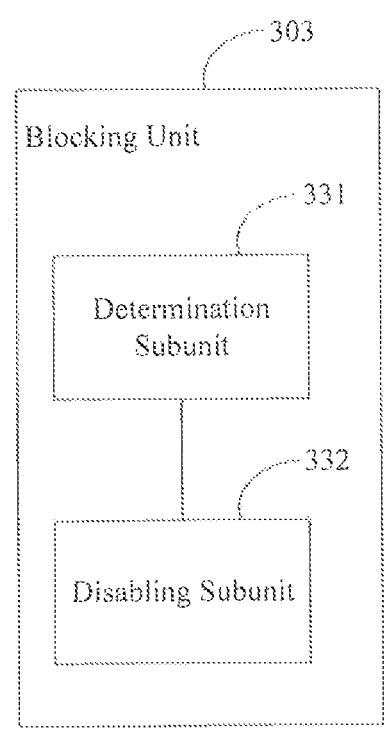

FIG. 6 is a block diagram of the blocking unit 303 (FIG. 3), according to an exemplary embodiment. Referring to FIG. 6, the blocking unit 303 includes a determination subunit 331 and a disabling subunit 332.

In exemplary embodiments, the determination subunit 331 is configured to determine a subarea in the fringe area corresponding to the palm touch information. The disabling subunit 332 is configured to disable the touch input function of the corresponding subarea.

Figure 7:
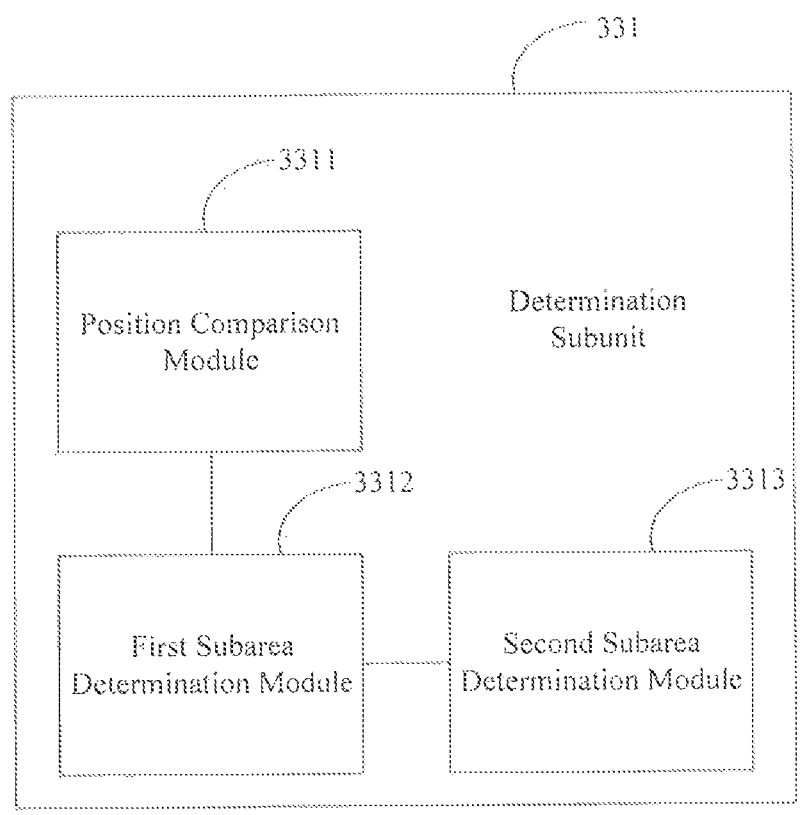

FIG. 7 is a block diagram of the determination subunit 331 (FIG. 6), according to an exemplary embodiment. Referring to FIG. 7, the determination subunit 331 includes a position comparison module 3311, a first subarea determination module 3312, and a second subarea determination module 3313.

In exemplary embodiments, the position comparison module 3311 is configured to compare a position coordinate in the palm touch information with a coordinate range of each subarea of the fringe area. The first subarea determination module 3312 is configured to determine a first subarea corresponding to the coordinate range including the position coordinate as the corresponding subarea. The second subarea determination subunit 3313 is configured to determine a second subarea associated with the first subarea as the corresponding subarea, the second subarea receiving a finger touch corresponding to the palm touch of the user holding a terminal including the apparatus 300 (FIG. 3).

Figure 8:
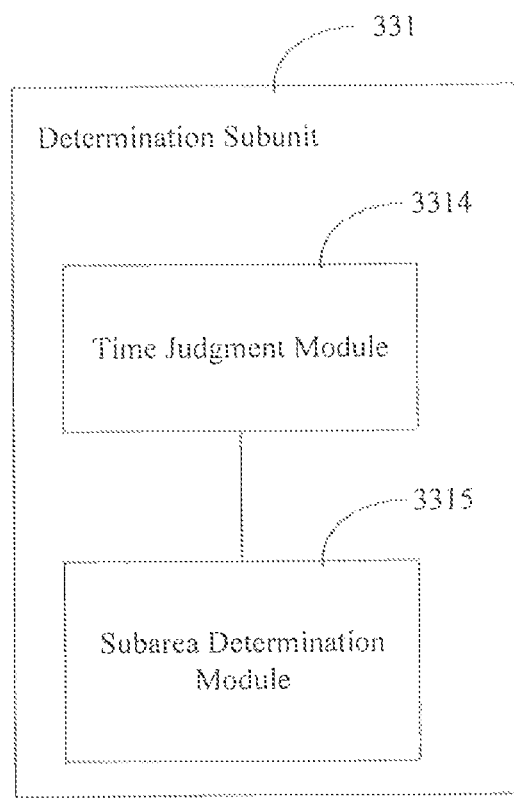

FIG. 8 is a block diagram of the determination subunit 331 (FIG. 6), according to an exemplary embodiment. Referring to FIG. 8, the determination subunit 331 includes a time judgment module 3314 and a subarea determination module 3315.

In exemplary embodiments, the time judgment module 3314 is configured to judge whether a time duration of the palm touch on the touch screen exceeds a preset time duration. The subarea determination module 3315 is configured to determine that a subarea in the fringe area corresponds to the palm touch information if the time duration of the palm touch exceeds the preset time duration.

Figure 9:
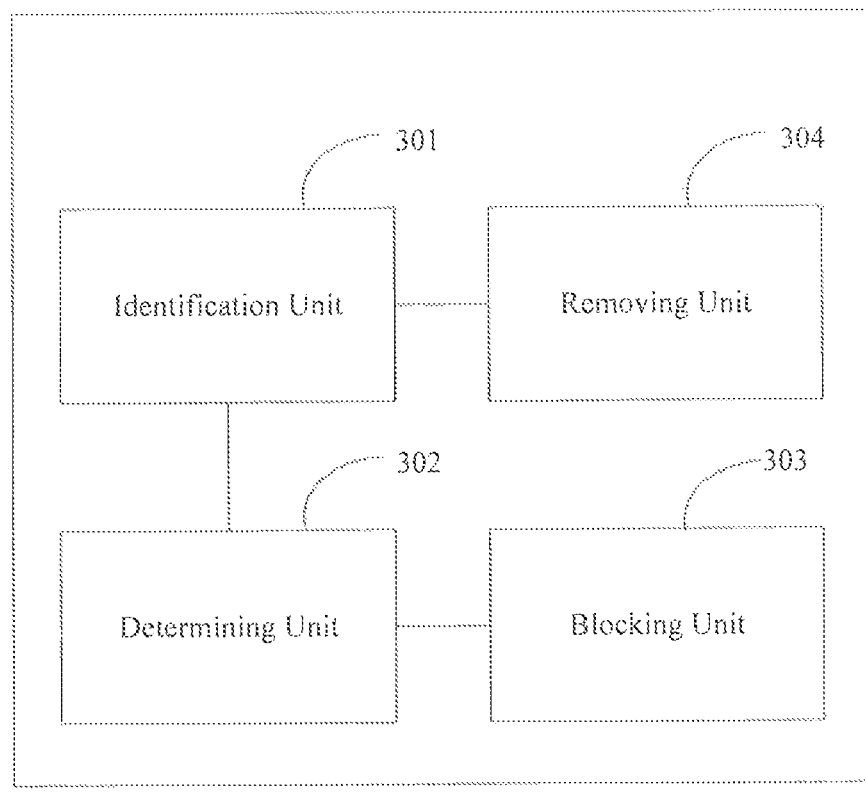

FIG. 9 is a block diagram of a touch input control apparatus 900, according to another exemplary embodiment. Referring to FIG. 9, in addition to the identification unit 301, the determining unit 302, and the blocking unit 303, the apparatus 900 further includes a removing unit 304 configured to remove palm touch information generated during a palm touch other than the palm touch information generated from the fringe area of the touch screen, i.e., the palm touch information generated from the central area of the touch screen.

Figure 10:
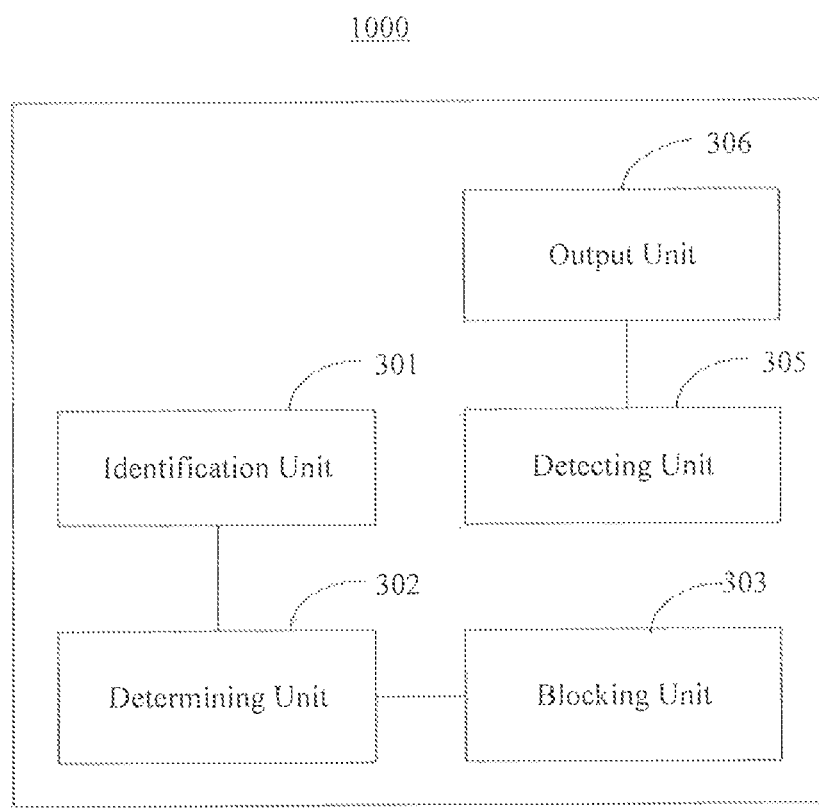

FIG. 10 is a block diagram of a touch input control apparatus 1000, according to another exemplary embodiment. Referring to FIG. 10, in addition to the identification unit 301, the determining unit 302, and the blocking unit 303, the apparatus 1000 further includes a detecting unit 305 and an output unit 306. The detecting unit 305 is configured to detect a finger touch operation area on the touch screen when the user is holding the terminal. The output unit 306 is configured to output a virtual touch control interface in the finger touch operation area.

Figure 11:
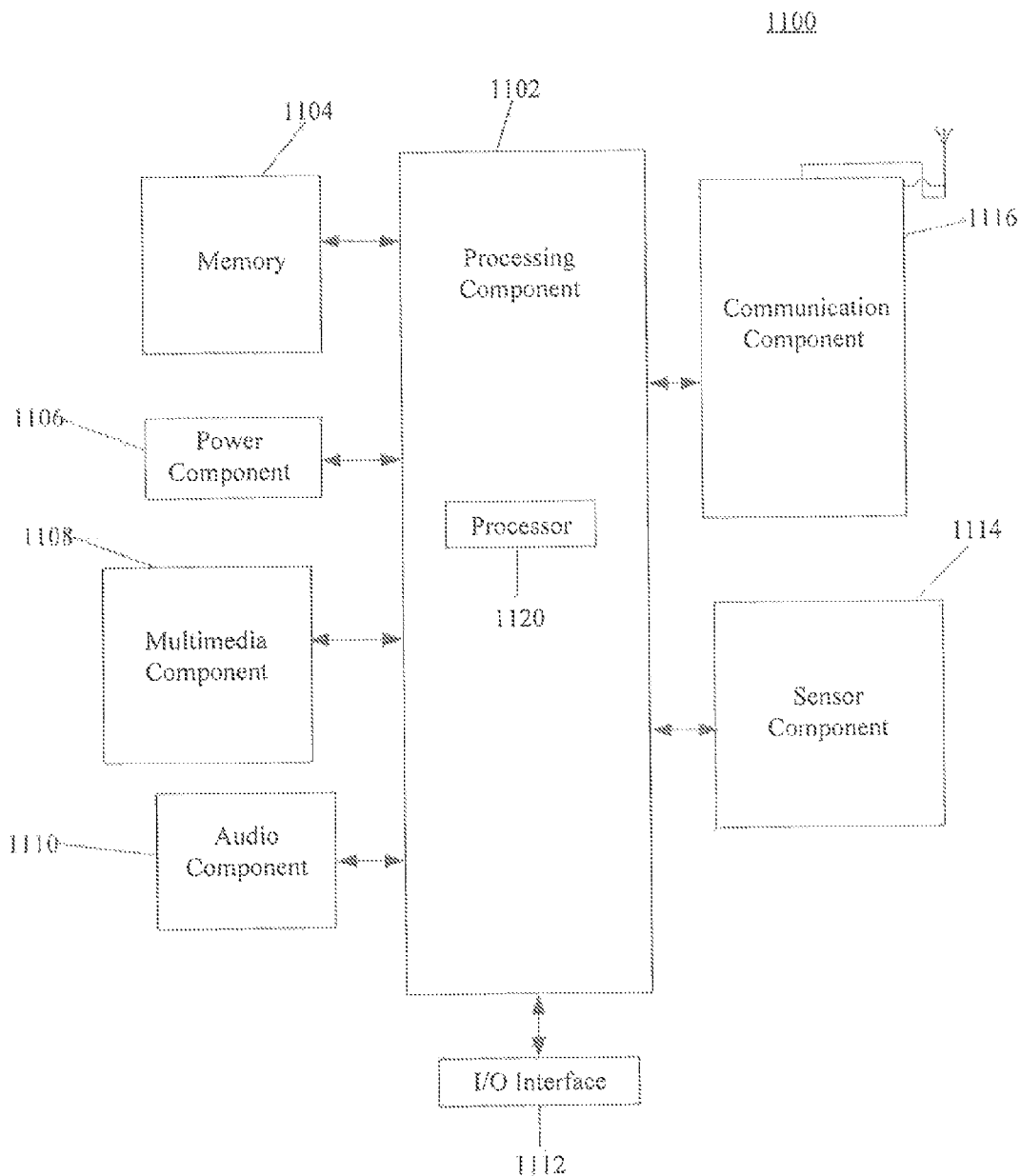
FIG. 11 is a block diagram of a device, according to an exemplary embodiment.

FIG. 11 is a block diagram of a device 1100, according to an exemplary embodiment. For example, the device 1100 may be a mobile phone, a computer, a digital broadcasting terminal, a message transceiver device, a game console, a tablet device, a medical device, a fitness facility, a personal digital assistant (PDA), and the like.

Referring to FIG. 11, the device 1100 may include one or more of the following components: a processor component 1102, a memory 1104, a power component 1106, a multimedia component 1108, an audio component 1110, an input/output (I/O) interface 1112, a sensor component 1114, and a communication component 1116.

The processor component 1102 generally controls the overall operation of the device 1100, for example, operation associated with display, telephone call, data communication, camera operation and record operation. The processor component 1102 may include one or more processors 1120 for executing instructions so as to perform the above described methods. In addition, the processor component 1102 may include one or more modules for the convenience of interaction between the processor component 1102 and other components. For example, the processor component 1102 may include a multimedia module for the convenience of interaction between the multimedia component 1108 and the processor component 1102.

The memory 1104 is configured for storing data of different types so as to support the operation of the device 1100. Examples of the data include instructions of any application program or method, contact data, phonebook data, messages, pictures and videos, etc., for operation on the device 1100. The memory 1104 may be realized by volatile or non-volatile memory device of any type or combination thereof, for example, static random access memory (SRAM), electrically erasable programmable read-only memory (EEPROM), erasable programmable read only memory (EPROM), programmable read-only memory (PROM), read-only memory (ROM), magnetic memory, flash memory, magnetic disk or optical disk.

The power component 1106 provides power for components of the device 1100. The power component 1106 may include a power management system, one or more power supplies, and other components associated with power generation, management and distribution for the device 1100.

The multimedia component 1108 includes a screen between the device 1100 and a user for providing an output interface. In some embodiments, the screen may include a liquid crystal display (LCD) and a touch panel (TP). If the screen includes a touch panel, the screen may be realized as a touch screen for receiving input signal from users. The touch panel includes one or a plurality of touch sensors for sensing gestures on the touch panel, for example, touching and sliding, etc. The touch sensor may not only sense boundary of touching or sliding, but also detect the duration and pressure related to the touching or sliding operation. In some embodiments, the multimedia component 1108 includes a front-facing camera and/or a rear-facing camera. When the device 1100 is under an operation mode, for example, a capture mode or a video mode, the front-facing camera and/or the rear-lacing camera may receive external multimedia data. Each front-facing camera and rear-facing camera may be a fixed optical lens system or have focal length and optical zoom capacity.

The audio component 1110 is configured for outputting and/or inputting audio signal. For example, the audio component 1110 includes a microphone (MIC). When the device 1100 is under an operation mode such as a call mode, a record mode and a speech recognition mode, the microphone is configured for receiving an external audio signal. The audio signal received may be further stored in the memory 1104 or sent out by the communication component 1116. In some embodiments, the audio component 1110 also includes a loudspeaker for outputting the audio signal.

The input/output interface 1112 provides an interface for the processor component 1102 and peripheral interface components, and the peripheral interface components may be a keyboard, a click wheel and buttons, etc. These buttons may include but not limited to: home page button, volume button, start button and locking button.

The sensor component 1114 includes one or more sensors for providing the device 1100 with state evaluation from all aspects. For example, the sensor component 1114 may detect the on/off state of the device 1100, relative positioning of components, for example, the display and keypads of the device 1100. The sensor component 1114 may also detect a position change of the device 1100 or a component thereof, the presence or absence of a user's touch on the device 1100, a direction or acceleration/deceleration of the device 1100, and a temperature variation of the device 1100. The sensor component 1114 may also include a proximity detector, which is configured for detecting the presence of nearby objects in case of no physical touch. The sensor component 1114 may also include an optical sensor, for example, CMOS or CCD image sensor used for imaging. In some embodiments, the sensor component 1114 may also include an acceleration sensor, a gyro sensor, a magnetic sensor, a pressure sensor, a microwave sensor or a temperature sensor.

The communication component 1116 is configured for wired communication or wireless communication between the device 1100 and other equipment. The device 1100 is capable of gaining access to a wireless network based on communication standards, for example, WiFi, 2G or 3G, or any combination thereof. In an exemplary embodiment, the communication component 1116 receives via a broadcast channel the broadcast signal or broadcast-related information from external broadcast management systems. In an exemplary embodiment, the communication component 1116 also includes a near field communication (NFC) component for promoting short-range communication. For example, the NFC component is realized based on a radio frequency identification (RFID) technology, an infrared data association (IrDA) technology, an ultra-wide bandwidth (UWB) technology, a Bluetooth (BT) technology, or any other technologies.

In exemplary embodiments, the device 1100 may be realized by one or more application specific integrated circuits (ASICs), digital signal processors (DSPs), digital signal processing equipment (DSPD), programmable logic devices (PLDs), field programmable gate arrays (FPGAs), controllers, microcontrollers, microprocessors or other electronic components configured to executing the above methods.

In exemplary embodiments, there is also provided a non-transitory computer-readable storage medium including instructions for performing the above-described methods. For example, the non-temporary computer-readable storage medium may be the memory 1104, which includes instructions executable by the processor 1120 of the device 1100, to perform the above described methods. Also for example, the non-temporary computer-readable storage medium may be a ROM, a random access memory (RAM), a CD-ROM, a magnetic tape, a floppy disk, an optical data storage device, etc.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for use in a device having a touch screen, comprising:
    identifying touch information at a fringe area of the touch screen as fringe touch information;

determining, according to a touch shape corresponding to the fringe touch information, whether the fringe touch information includes palm touch information generated from a palm touch by any part of a user's palm; and
blocking the palm touch information if it is determined that the fringe touch information includes the palm touch information, wherein the blocking includes:
determining a subarea in the fringe area corresponding to the fringe palm touch information; and
disabling a touch input function of the subarea.

2. The method of claim 1, wherein the identifying comprises:
obtaining the touch information when the user performs a touch operation on the touch screen;
judging, according to a position coordinate included in the touch information, whether the touch operation is performed in the fringe area of the touch screen; and
determining the touch information as the fringe touch information if the touch operation is performed in the fringe area of the touch screen.

3. The method of claim 1, wherein the determining whether the fringe touch information includes the touch information comprises:
obtaining the touch shape corresponding to the fringe touch information based on a distribution of touch spots in the fringe area;
judging whether the obtained touch shape corresponding to the fringe touch information matches a preset palm touch shape; and
determining that the fringe touch information includes the palm touch information if the obtained touch shape corresponding to the fringe touch information matches the preset palm touch shape.

4. The method of claim 1, wherein the determining of the corresponding subarea comprises:
comparing a position coordinate included in the fringe palm touch information with a coordinate range of each subarea in the fringe area; and
determining a first subarea corresponding to the coordinate range including the position coordinate as the corresponding subarea.

5. The method of claim 4, further comprising:
determining a second subarea in the fringe area associated with the first subarea as the corresponding subarea, the second subarea receiving a finger touch corresponding to the palm touch for the user to hold the device.

6. The method of claim 1, wherein the determining of the subarea in the fringe area comprises:
judging whether a time duration of the palm touch on the touch screen exceeds a preset time duration; and
determining that the subarea corresponds to the palm touch information if the time duration of the palm touch exceeds the preset time duration.

7. The method of claim 1, further comprising:
removing palm touch information generated from a central area of the touch screen.

8. The method of claim 1, further comprising:
detecting a finger touch operation area on the touch screen when the device is held; and
outputting a virtual touch control interface in the finger touch operation area.

9. A device, comprising:
a processor;
a touch screen; and
a memory configured to store instructions executable by the processor;

wherein the processor is configured to:
identify touch information at a fringe area of the touch screen as fringe touch information;
determine, according to a touch shape corresponding to the fringe touch information, whether the fringe touch information includes palm touch information generated from a palm touch by any part of a user's palm; and
block the palm touch information if it is determined that the fringe touch information includes the palm touch information, wherein, in blocking the palm touch information, the processor is further configured to:
determine a subarea in the fringe area corresponding to the fringe palm touch information; and
disable a touch input function of the subarea.

10. The device of claim 9, wherein the processor is further configured to:
obtain the touch information when the user performs a touch operation on the touch screen;
judge, according to a position coordinate included in the touch information, whether the touch operation is performed in the fringe area of the touch screen; and
determine the touch information as the fringe touch information if the touch operation is performed in the fringe area of the touch screen.

11. The device of claim 9, wherein the processor is further configured to:
obtain the touch shape corresponding to the fringe touch information based on a distribution of touch spots in the fringe area;
judge whether the obtained touch shape corresponding to the fringe touch information matches a preset palm touch shape; and
determine that the fringe touch information includes the palm touch information if the obtained touch shape corresponding to the fringe touch information matches the preset palm touch shape.

12. The device of claim 9, wherein the processor is further configured to:
compare a position coordinate included in the fringe palm touch information with a coordinate range of each subarea in the fringe area; and
determine a first subarea corresponding to the coordinate range including the position coordinate as the corresponding subarea.

13. The device of claim 12, wherein the processor is further configured to:
determine a second subarea in the fringe area associated with the first subarea as the corresponding subarea, the second subarea receiving a finger touch corresponding to the palm touch for the user to hold the device.

14. The device of claim 9, wherein the processor is further configured to:
judge whether a time duration of the palm touch on the touch screen exceeds a preset time duration; and
determine that the subarea corresponds to the palm touch information if the time duration of the palm touch exceeds the preset time duration.

15. The device of claim 9, wherein the processor is further configured to:
remove palm touch information generated from a central area of the touch screen.

16. The device of claim 9, wherein the processor is further configured to:
detect a finger touch operation area on the touch screen when the device is held; and
output a virtual touch control interface in the finger touch operation area.

17. A non-transitory computer-readable storage medium having stored therein instructions that, when executed by a processor of a device having a touch screen, cause the device to perform a touch input control method, the method comprising:
- identifying touch information at a fringe area of the touch screen as fringe touch information;
- determining, according to a touch shape corresponding to the fringe touch information, whether the fringe touch information includes palm touch information generated from a palm touch by any part of a user's palm; and
- blocking the palm touch information if it is determined that the fringe touch information includes the palm touch information, wherein the blocking includes:
    - determining a subarea in the fringe area corresponding to the fringe palm touch information; and
    - disabling a touch input function of the subarea.

* * * * *